United States Patent
Pettitt et al.

(10) Patent No.: US 7,832,870 B2
(45) Date of Patent: Nov. 16, 2010

(54) PROJECTION SYSTEM USING REFLECTED LIGHT FROM A COLOR WHEEL

(75) Inventors: Gregory S. Pettitt, Farmersville, TX (US); Andrew I. Russell, Plano, TX (US); Bradley W. Walker, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1066 days.

(21) Appl. No.: 11/482,701

(22) Filed: Jul. 6, 2006

(65) Prior Publication Data

US 2008/0007699 A1    Jan. 10, 2008

(51) Int. Cl.
G03B 21/26    (2006.01)
(52) U.S. Cl. .............. 353/37; 353/33; 353/34; 353/84; 353/31; 353/98; 353/122; 359/196.1; 359/201.1; 359/237; 359/290; 359/291; 359/321; 359/636; 348/771; 348/800; 348/801; 345/36; 345/39; 345/44; 345/45; 345/76
(58) Field of Classification Search ............... 359/290, 359/291, 321, 223, 224, 636, 639, 634, 635, 359/196.1, 201.1, 237; 349/5, 7, 8, 9, 61, 349/62, 69, 70; 345/36, 39, 44, 45, 46, 76, 345/82, 83; 353/33, 34, 37, 84, 122; 348/742, 348/743, 771
See application file for complete search history.

(56) References Cited

U.S. PATENT DOCUMENTS

| | | | |
|---|---|---|---|
| 6,392,717 B1 | 5/2002 | Kunzman | |
| 6,398,389 B1 * | 6/2002 | Bohler et al. | 362/293 |
| 6,419,365 B1 * | 7/2002 | Potekev et al. | 353/98 |
| 6,445,505 B1 | 9/2002 | Morgan | |
| 6,567,134 B1 | 5/2003 | Morgan | |
| 6,906,852 B1 | 6/2005 | Russell | |
| 2002/0130977 A1 * | 9/2002 | Hibi | 348/744 |
| 2005/0141076 A1 * | 6/2005 | Bausenwein et al. | 359/291 |

FOREIGN PATENT DOCUMENTS

JP    264953    9/1999

* cited by examiner

Primary Examiner—Georgia Y Epps
Assistant Examiner—Sultan Chowdhury
(74) Attorney, Agent, or Firm—Charles A. Brill; Wade James Brady, III; Frederick J. Telecky, Jr.

(57) ABSTRACT

According to one embodiment, a projection system includes a color wheel operable to filter light into a passed component and a reflected component. The projection system also includes a digital micromirror device comprising a plurality of micromirrors each operable to receive the passed component and the reflected component. Each micromirror is selectively positionable to direct, at approximately the same time, the passed component and the reflected component to desired locations. The projection system also includes an optical system operable to direct the passed component and the reflected component from the color wheel to the digital micromirror device at approximately the same time.

21 Claims, 3 Drawing Sheets

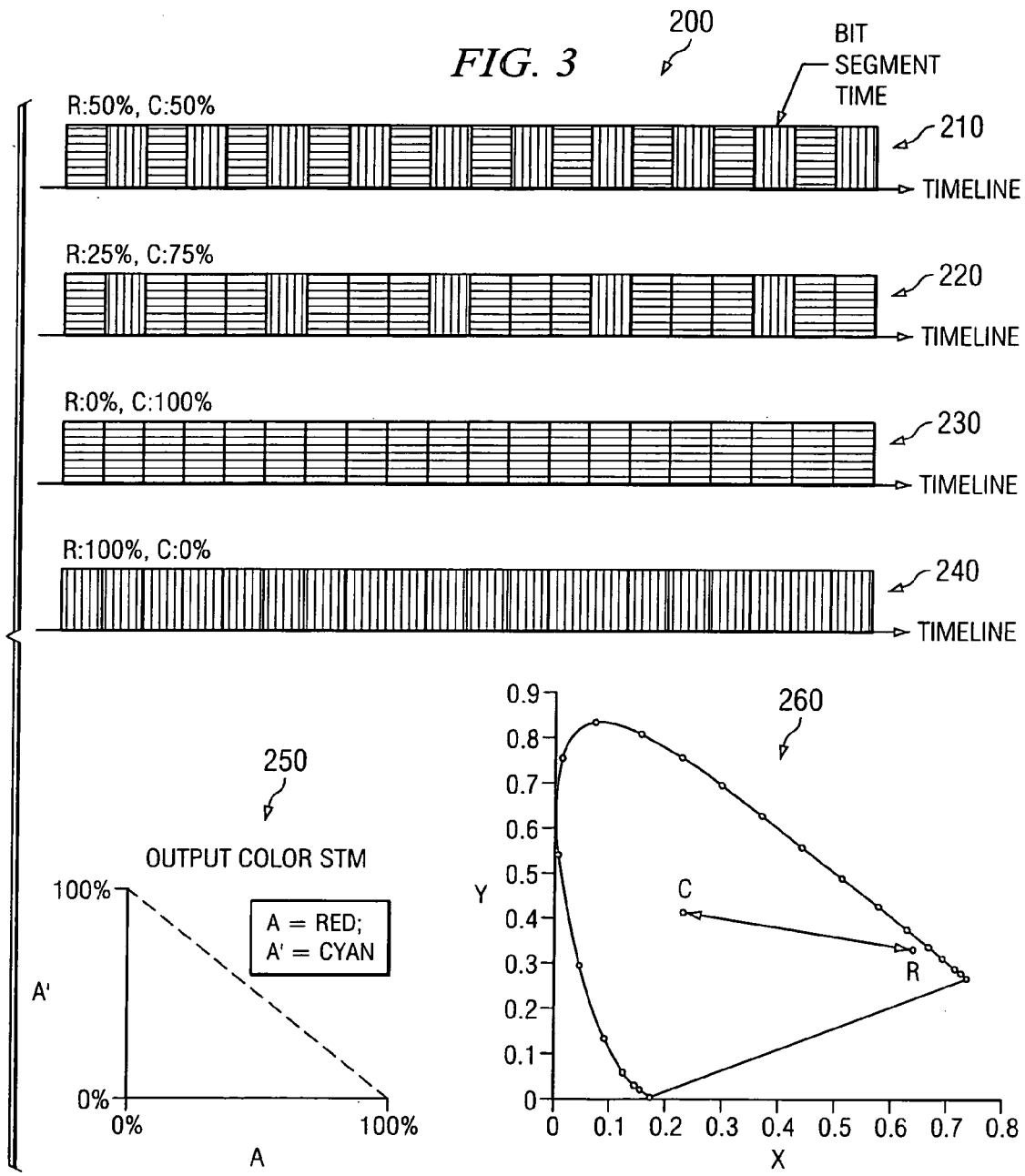

PROJECTION SYSTEM USING REFLECTED LIGHT FROM A COLOR WHEEL

TECHNICAL FIELD OF THE DISCLOSURE

The present disclosure relates generally to projection systems and, more particularly, to a projection system using reflected light from a color wheel.

BACKGROUND

Projection systems have experienced substantial technical advances in recent years. Some projection systems now operate by shining lamp light onto a spinning color wheel made of different color filter segments, allowing different wavelengths of light (colors) to pass through the wheel at different times over the course of one rotation of the wheel. These projection systems then pass the filtered light to a digital micromirror device comprising a plurality of individual mirror elements that can be selectively controlled to reflect the filtered light toward or away from a projection lens to generate an image. Although projection systems have experienced substantial technical advancement, there remains a need for increased image quality.

OVERVIEW OF EXAMPLE EMBODIMENTS

According to one embodiment, a projection system includes a color wheel operable to filter light into a passed component and a reflected component. The projection system also includes a digital micromirror device comprising a plurality of micromirrors each operable to receive the passed component and the reflected component. Each micromirror is selectively positionable to direct, at approximately the same time, the passed component and the reflected component to desired locations. The projection system also includes an optical system operable to direct the passed component and the reflected component from the color wheel to the digital micromirror device at approximately the same time.

Technical advantages of one or more embodiments of the present disclosure may include increasing the brightness of a projected image by using the light reflected from the color wheel in addition to the light filtered through the color wheel to create the image. This brightness may be achieved in particular embodiments without decreasing the brightness of primary colors. Secondary colors may also experience increased brightness in particular embodiments. Other technical advantages of particular embodiments may include enhancing the color performance of secondary colors and reducing or eliminating the rainbow effect. Projection systems in particular embodiments may also be programmable to use light reflected from a color wheel to achieve different image quality goals.

It will be understood that the various embodiments of the present disclosure may include some, all, or none of the enumerated technical advantages. In addition, other technical advantages of the present disclosure may be readily apparent to one skilled in the art from the figures, description and claims included herein.

BRIEF DESCRIPTION OF THE DRAWINGS

For a more complete understanding of the present disclosure and its features and advantages, reference is now made to the following description, taken in conjunction with the accompanying drawings, in which:

FIG. 3 is an illustration of example combinations of a passed color and its reflected complement by a micromirror over a single color wheel segment.

DETAILED DESCRIPTION

Figure 1A:
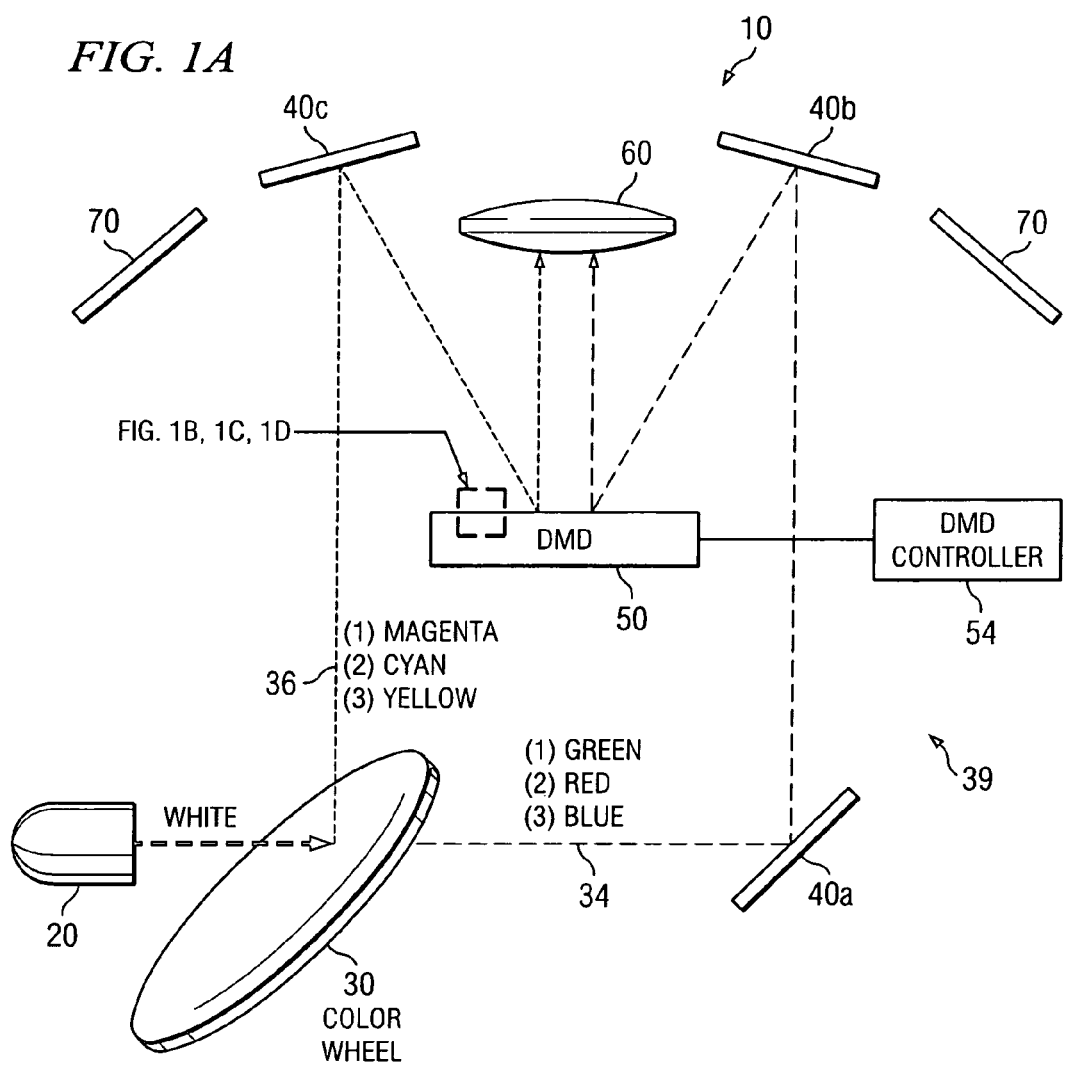
FIG. 1A is a diagram illustrating an example projection system.

FIG. 1A is a diagram illustrating an example projection system 10. Projection system 10 includes, in this embodiment, a lamp 20, a color wheel 30, an optical system 39 including optical components 40, a digital micromirror device (DMD) 50, a DMD controller 54, a projection lens 60, and a plurality of light dumps 70. Projection system 10 is operable to utilize light reflected from and passed through color wheel 30 to generate an image. Lamp 20 includes any suitable light source. In the illustrated embodiment, lamp 20 emits white light and is oriented toward color wheel 30. However, lamp 20 may emit any suitable type of light and be oriented in any suitable orientation.

Color wheel 30 includes any suitable color wheel comprising any suitable number of segments. Each segment may include a filter operable to filter light of a particular wavelength band. For example, color wheel 30 may include a green segment, a red segment, and a blue segment in particular embodiments. In alternative embodiments, color wheel 30 may include one or more additional white or yellow-white segments to facilitate the projection of a brighter image. In alternative embodiments, color wheel may also include segments of colors complementary to green, red, and blue. Because there may be any suitable number and type of color segments in color wheel 30, for the sake of simplicity, the following discussion will assume that color wheel 30 includes three colors: green, red, and blue. However, as discussed above, projection system 10 may include any suitable color wheel 30 with any suitable number and type of segments.

Color wheel 30 may rotate, allowing particular segments to receive and filter light emitted by lamp 20 at particular time intervals during a rotation. For example, the green segment may receive and filter light from lamp 20 during a first time interval, the red segment may receive and filter light from lamp 20 during a second time interval, and the blue segment may receive and filter light from lamp 20 during a third time interval, the three time intervals corresponding to one rotation of color wheel 30. Each segment is operable to filter received light by passing a particular band of wavelengths, as indicated by reference numeral 34, and reflecting the remainder of the light, as indicated by reference numeral 36, absorbing little, if any, of the light. For example, the green segment may pass a particular band of wavelengths associated with green color and reflect the remainder of the light (i.e. the rest of the wavelengths comprising white light), the red segment may pass a particular band of wavelengths associated with red light and reflect the remainder of the light, and the blue segment may pass a particular band of wavelengths associated with blue light and reflect the remainder of the light.

In many typical projection systems having color wheels, light reflected from the color wheel is not used. These systems may, for example, absorb reflected light using a light dump. Alternatively, these systems may send the light back towards the lamp. Only the filtered light that passes through the color wheel is used to create an image. In creating the image, these systems make a substantial sacrifice in brightness and other image quality metrics by using only a share of the lamp light (the filtered light) to project the image. As consumer demand for increased brightness and other image quality metrics has strengthened, these projection systems have necessitated either brighter, and more expensive, lamps or other ways to increase image brightness and quality. To meet brightness goals, some of these projection systems have added white segments to their color wheel, increasing the brightness of whites in the projected image. However, this method of increasing brightness may actually dim the primary and secondary colors projected. Thus, the teachings of the invention recognize that a need exists for a projection system that can increase brightness in other ways.

Projection system 10 is operable to enhance the quality of a projected image by using the light passed and reflected by color wheel 30, as discussed further below. The light reflected from color wheel 30, as indicated by reference numeral 36, is typically associated with a color. This color normally corresponds to the complement of the light component passed by color wheel 30, as indicated by reference numeral 34. For example, as discussed above, the green segment of color wheel 30 may pass green light and reflect the remainder of received light. The reflected remainder, composed of those wavelengths not included in the band of green, is associated with green's complement magenta. The red segment of color wheel 30 may pass red light and reflect the remainder, corresponding to red's complement cyan. The blue segment of color wheel 30 may pass blue light and reflect the remainder, corresponding to blue's complement yellow. It should be noted that, in particular cases, the color associated with the reflected remainder 36 may be less saturated than the passed component's color and correspond only generally to the passed component's complement.

Color wheel 30 is configured to direct the reflected component of light to DMD 50. To do so, in particular embodiments, color wheel 30 and/or its segments may be tilted with respect to the light received from lamp 20. As discussed further below, DMD 50 may use the reflected light 36 to enhance the quality of a projected image by, for example, increasing the brightness of the color white or of complementary colors.

Optical system 39 may include any suitable number and type of optical components 40 operable to direct the components of light passed and reflected by color wheel 30 to DMD 50. Optical components 40 may include, for example, mirrors, optical fibers, or any other suitable optical components. For example, optical component 40a may include a reflective device such as a mirror operable to receive light passed by color wheel 30 and direct the light to optical component 40b. Optical component 40b may include a reflective device such as a mirror operable to receive light reflected by optical component 40a and direct the light to the micromirrors of DMD 50. Optical component 40c may include a reflective device such as a mirror operable to receive light reflected by color wheel 30 and direct the light to the micromirrors of DMD 50. It should be noted that the position, orientation, type, and number of optical components 40 in optical system 39 may vary in any suitable manner.

Figure 1B:
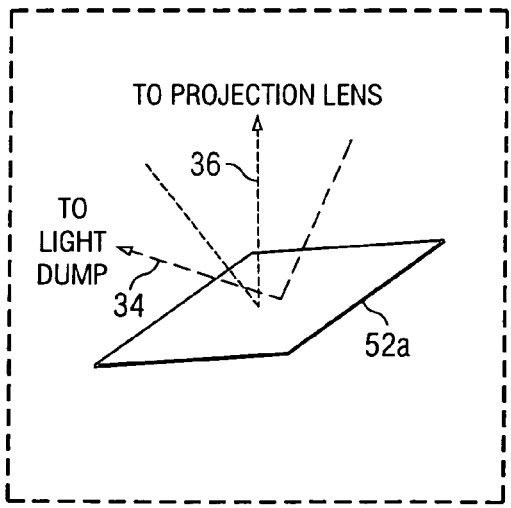
FIGS. 1B, 1C, and 1D are diagrams illustrating three example states for a micromirror of FIG. 1A.
Figure 1C:
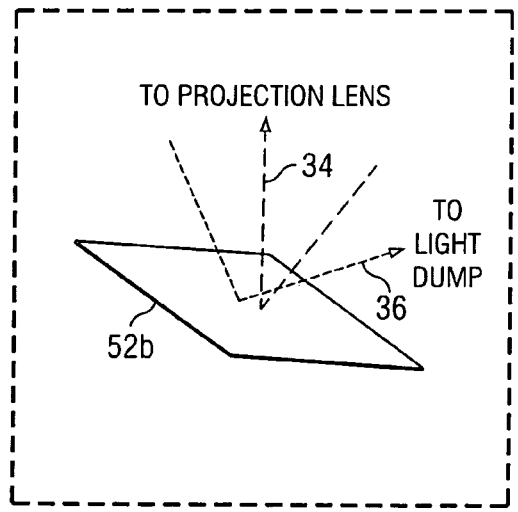
Figure 1D:
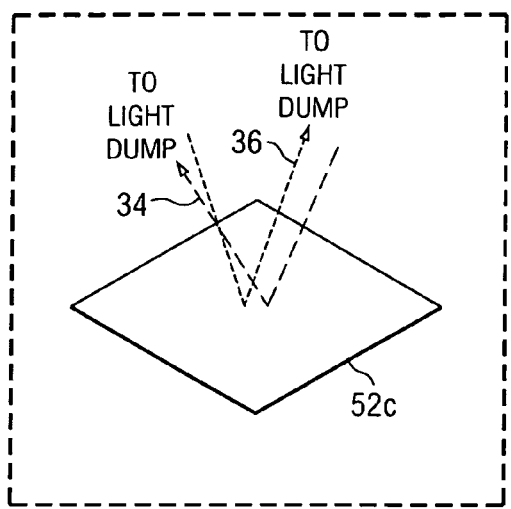

DMD 50 may include a plurality of micromirrors 52 each operable to receive the passed component and the reflected component of light from color wheel 30. In particular embodiments, DMD 50 may include an array of thousands of tilting micromirrors 52. However, in alternative embodiments, DMD 50 may include any other suitable number of arrays and micromirrors. Each micromirror 52 may be selectively positionable to each of at least three states to direct passed light, reflected light, or no light from color wheel 30 to projection lens 60, as illustrated in FIGS. 1B, 1C, and 1D. To permit the micromirrors to selectively tilt to a particular position, in particular embodiments, each micromirror may be attached to one or more hinges mounted on support posts and spaced by an air gap over underlying control circuitry. In particular embodiments, the control circuitry may provide electrostatic forces, based at least in part on image data received by a controller.

FIGS. 1B, 1C, and 1D are diagrams illustrating three example states for a micromirror 52 of FIG. 1A. In a first state, illustrated in FIG. 1B, a micromirror 52a is positioned to direct the component of light reflected by color wheel 30, as indicated by reference numeral 36, toward projection lens 60, directing the component of light passed by color wheel 30 (i.e. filtered component 34) toward light dump 70. In a second state, illustrated in FIG. 1C, a micromirror 52b is positioned to direct the component of light passed by color wheel 30 (passed component 34) to projection lens 60, directing the component of light reflected by color wheel 30 (reflected component 36) to light dump 70. In a third state, illustrated in FIG. 1D, micromirror 52c is positioned to direct no light to projection lens 60, directing the components of light passed and reflected by color wheel 30 (passed component 34 and reflected component 36) to light dumps 70. It should be noted that, in particular embodiments, each micromirror 52 may also be selectively positionable to a fourth state (not illustrated) to direct both the component of light passed by color wheel 30 (passed component 34) and the component of light reflected by color wheel 30 (reflected component 36) to projection lens 60.

DMD controller 54 includes any suitable controller operable to cause DMD 50 to selectively position each micromirror 52 in one of the three states, thereby directing light to projection lens 60 in the form of an image pattern. Particular pixels of the image pattern may correspond to light passed by color wheel 30 (passed component 34), particular pixels of the image pattern may correspond to light reflected by color wheel 30 (reflected component 36), and particular pixels of the image pattern may correspond to no light. In many typical projection systems, only the light passed by a color wheel, and the absence of light, are used to create an image. By causing DMD 50 to also selectively direct reflected component 36 to lens 60, DMD controller 54 may be further operable to increase the brightness and/or color performance of a projected image (which may include a plurality of image patterns) and/or to reduce the color breakup of a projected image. Example combinations of a passed color 34 and its reflected complement 36 by a micromirror 52 over a single color wheel segment are discussed further below, in conjunction with FIG. 3.

Projection lens 60 may include any suitable lens, such as, for example, a glass lens, operable to receive image patterns of light from DMD 50 and project the image patterns for display. Each image pattern may correspond to a filter segment of color wheel 30, and one or more consecutive image patterns may include light filtered (i.e. passed and/or reflected) by a single filter segment. By projecting a sequence of differently colored image patterns over a short period of time, projection system 10 may blend the colors for a viewer to perceive a correctly colored image comprising a plurality of the differently colored image patterns.

Light dumps 70 may include any suitable light dumps, such as, for example, light absorbers, made of any suitable material. Light dumps 70 may be operable to receive light from color wheel 30 and/or DMD 50 and substantially absorb the light. There may be any suitable number of light dumps 70, and a "light dump" may refer to one or more light dumps.

In operation, according to a particular embodiment, lamp 20 emits white light. During a particular time interval, a particular color segment of color wheel 30, such as, for example, the green segment of the example color wheel 30, receives light from lamp 20 and filters the light. The green segment filters the received light by passing a particular band of wavelengths associated with green color (passed component 34) and reflecting the remainder of the light (reflected component 36). The green segment of color wheel 30 may direct the passed and reflected components of light to optical components 40 of optical system 39. Optical components 40 direct the passed and reflected components of light from color wheel 30 to the micromirrors 52 of DMD 50. By causing DMD 50 to selectively position each micromirror 52 to one of at least three states, DMD controller 54 causes DMD 50 to produce an image pattern of the passed and reflected components, and of no component of light. The image pattern produced by DMD 50 passes to projection lens 60, which then projects the pattern for display. By projecting a sequence of differently colored image patterns over a short period of time, projection system 10 integrates the colors for a viewer to perceive a correctly colored image comprising a plurality of the differently colored image patterns.

As discussed above, in particular embodiments, using the light reflected from color wheel 30 may produce a substantial increase in brightness for colors complementary to the primary colors on color wheel 30 and for white. In addition, in particular embodiments, the primary colors of system 10 may have increased brightness relative to those systems that reduce the size of primary color segments to introduce white segments or secondary color segments into the color wheel to increase the brightness of those colors. Additionally, in particular embodiments, secondary colors, corresponding to the size of their complementary primary color segment on the color wheel, may each be brighter than in systems that add secondary color segments to the color wheel which are not as large. In addition, projection system 10 may provide increased color performance in particular embodiments. For example, secondary colors may be reproduced during the entire frame time by using combinations of two of the primary colors and the reflection of the third primary color. Additionally, color breakup can be reduced. For example, the rainbow effect can be reduced or eliminated by displaying complementary colors on the screen in sequence using a temporal pattern. As illustrated by these examples, using the component of light reflected from color wheel 30 may in particular embodiments enhance image quality relative to typical projection systems. In addition, use of the reflected light may be tailored to particular contexts.

Modifications, additions, or omissions may be made to the projection system 10 described without departing from the scope of the disclosure. The components of the projection system 10 described may be integrated or separated according to particular needs. Moreover, the operations of the projection system 10 described may be performed by more, fewer, or other components without departing from the scope of the present disclosure.

Figure 2:
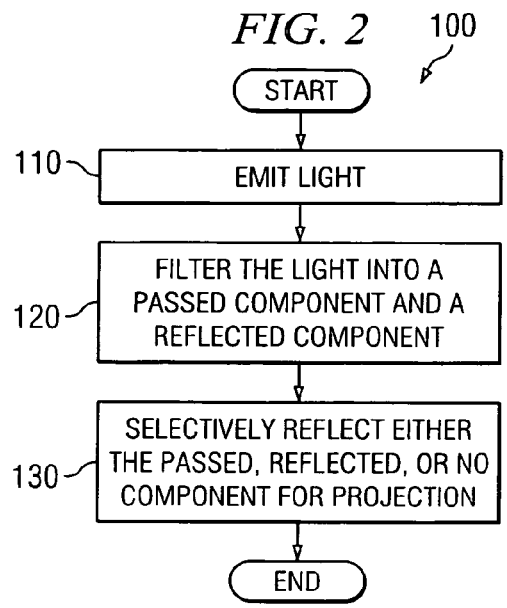
FIG. 2 is a flowchart illustrating an example method for projecting light.

FIG. 2 is a flowchart illustrating an example method 100 for projecting light. At step 110, light is emitted. In particular embodiments, light may be emitted by a lamp or any other suitable light source. The light may be, for example, white light. At step 120, the light is filtered into a passed component and a reflected component. The light may be filtered in particular embodiments by a color wheel comprising color segments, the color wheel passing one component of light and reflecting another component of light. Alternatively, light could be reflected by other types of filters, particularly in embodiments utilizing multiple light sources with no color wheel. The passed and reflected components can then be forwarded in any suitable manner, such as, for example, by using optical components. At step 130, either the passed, reflected, or no component is selectively reflected for projection. The step may be performed by, for example, each micromirror in a DMD after receiving the forwarded light, the DMD controlled by, for example, a DMD controller. By selectively positioning each micromirror in one of the three states described above in conjunction with FIGS. 1B, 1C, and 1D, an image pattern may be produced and projected, the image pattern including passed and/or reflected components and/or no component of light. By projecting a sequence of differently colored image patterns over a short period of time, the projection can fool a viewer's eyes into perceiving a correctly colored image comprising a plurality of the differently colored image patterns.

Modifications, additions, or omissions may be made to the method 100 described without departing from the scope of the disclosure. The components of the method 100 described may be integrated or separated according to particular needs. Moreover, the operations of the method 100 described may be performed by more, fewer, or other components without departing from the scope of the present disclosure.

FIG. 3 is an illustration of example combinations 200 of a passed color and its reflected complement by a micromirror over a single color wheel segment. As discussed above in conjunction with FIG. 1A, during the time interval that a single color segment filters, the segment passes one component of light (one color) and reflects the remainder of the light, corresponding to the passed color's complement. The segment directs the passed and reflected light to the DMD, and the DMD may receive these components at approximately the same time. Each micromirror of the DMD can be selectively positioned to reflect the passed color, the reflected complement, or neither color to a lens. In this way, the DMD creates an image pattern for projection.

Example combinations 200 shows four timelines, 210, 220, 230 and 240, representing a single color segment of a color wheel over which a micromirror combines a passed color (i.e. red) and its reflected complement (i.e. cyan). Within the period of time corresponding to the single color segment, the micromirror can be repositioned several times in the illustrated example combinations 200. A micromirror can be repositioned (or not) after the end of a bit segment time, represented in the illustration by the individual blocks on each timeline. Bits are uniform in length in the illustrated example combinations 200 and are shaded differently to represent whether the passed color or its reflected complement is being directed by the micromirror to a lens for projection during the bit segment time. It should be noted that, in particular embodiments, a DMD controller may cause the repositioning of a micromirror according to a particular pattern to produce a particular color, shade of color, or other suitable effect.

In timeline 210, the micromirror tilts alternatively between directing red and its complement cyan for projection. For example, in the first bit segment illustrated, the micromirror is positioned to direct cyan for projection, directing red to a light dump. In the second bit segment illustrated, the micromirror changes position to direct red for projection, directing cyan to a light dump. A result of tilting a micromirror to direct a color and its complement in alternating bit segments for projection may be to "fool" a viewer's eyes into perceiving a white color for the pixel associated with the particular micromirror. The white color may also have enhanced brightness.

In timeline 220, the micromirror tilts twenty-five percent of the time to direct the passed color (i.e. red) for projection and seventy-five percent of the time to direct the reflected complement (i.e. cyan) for projection. This pattern results in a color perceived by a viewer comprising the combination of primary and complementary colors in those proportions.

In timeline 230, the micromirror tilts for the entire duration to direct the complementary color (i.e. cyan) for projection, directing the passed color (i.e. red) to a light dump. The ability to direct the complementary color for projection during this time interval enhances the brightness and performance of the complementary color relative to systems that would project nothing during this time interval (because they do not use reflected light).

In timeline 240, the micromirror tilts for the entire duration to direct the passed color (i.e. red) for projection, directing the complement (i.e. cyan) to a light dump. Timeline 240 corresponds to the only type of projection that can be achieved by typical projection systems during one color segment (other than interlacing dark segments). As is illustrated, example embodiments of the present disclosure can continue to perform in this manner.

Illustration 200 also provides two graphs 250 and 260. Graph 250 shows how, in particular embodiments, each micromirror can display anything between zero and one hundred percent of the passed color or its complement, or any combination of the passed color and its complement not exceeding one hundred percent. Graph 260 shows how, in particular embodiments, continuous tone range can be achieved by mixing the passed color and its complement. In particular embodiments, example combinations 200 may be achieved using spatial temporal multiplexing (STM) pulse width modulation (PWM) techniques. However, in alternative embodiments, combinations 200 may be achieved in any other suitable manner.

In particular embodiments, example combinations 200, as well as other suitable combinations, can enhance different image quality metrics using the reflected light component. Where it is desirable to enhance one or more particular image quality metrics, the projection system may, in particular embodiments, be configurable to adapt to these circumstances. For example, where increased brightness is desirable (i.e. in a conference room setting), the projection system may be configured to use reflected light to provide increased brightness. Where increased color performance is desirable (i.e. home entertainment), the projection system may be configured to use reflected light to provide increased color performance. In particular embodiments, a projection system may be configurable to operate in these two modes, and an operator may switch between the two modes of operation.

Figure 4:
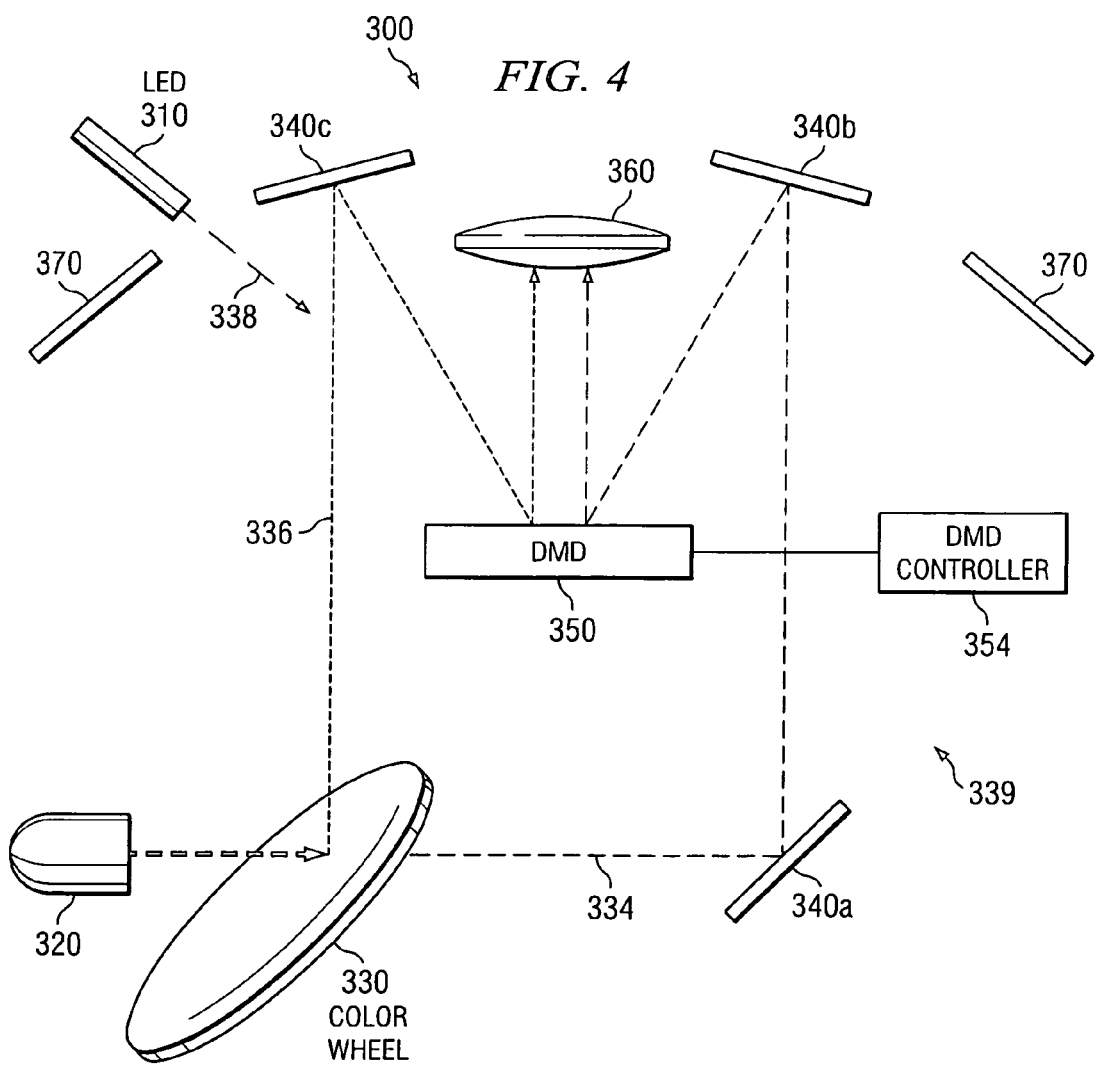
FIG. 4 is a diagram illustrating another example projection system.

FIG. 4 is a diagram illustrating another example projection system 300. Projection system 300 includes an LED 310, a lamp 320, a color wheel 330, an optical system 339 including optical components 340, a DMD 350, a DMD controller 354, a projection lens 360, and a plurality of light dumps 370. Projection system 300 is operable to utilize light reflected from and passed through color wheel 30 in combination with or in the alternative to light from LED 310 to generate an image pattern of enhanced quality. It should be noted that lamp 320, optical system 339 including optical components 340, lens 360, and light dumps 370 may be the same as or similar to lamp 20, optical system 39 including optical components 40, lens 60, and light dumps 70, respectively, described above in conjunction with FIG. 1A. These components will thus not be described again.

LED 310 may include any suitable secondary light source such as one or more light-emitting diodes (LED), a laser, a lamp with a corresponding filter, or any other suitable light source or combination of light sources. LED 310 is operable to emit light and direct the emitted light to DMD 350. In particular embodiments, LED 310 may take the role of one of the color segments in color wheel 330, such as, for example, one of the primary colors green, red, and blue. Because LED 310 may take the role of one of the color segments, color wheel 330 may include one less color segment, the one whose role is replaced by LED 310, enlarging the segments for the other colors. By enlarging the segments for the other colors, the brightness and image quality of these colors may be enhanced.

DMD 350 may include a plurality of micromirrors, analogously to DMD 50 of FIG. 1A. However, each micromirror in DMD 350 may be selectively positionable to one of four states. Three of the states may be similar to those described above in conjunction with FIGS. 1A, 1B, 1C, and 1D; however, in each of these three states, the micromirror is also positioned to direct light from LED 310 to a light dump 370. In the fourth state, a micromirror in DMD 350 is positioned to direct light from LED 310 to projection lens 360 and to direct the components of light passed and reflected by color wheel 330 to light dumps 370. DMD controller 354 includes any suitable controller operable to cause DMD 350 to selectively position each micromirror 52 in one of the four states, thereby directing light to projection lens 60 in the form of an image pattern.

In operation, according to a particular embodiment, lamp 320 emits white light and LED 310 emits light associated with a particular band of wavelengths. During a particular time interval, a particular color segment of color wheel 330 receives light from lamp 320 and filters the light. The segment filters received light by passing a particular band of wavelengths associated with a desired color, as indicated by reference numeral 334, and reflecting the remainder of the light, as indicated by reference numeral 336. The segment directs the passed and reflected components of light to optical system 339. Optical components 340 of optical system 339 direct the passed and reflected components of light from color wheel 330 to the micromirrors of DMD 350. The micromirrors of DMD 350 receive the reflected and passed components of light from color wheel 330 and also receive light emitted by LED 310, as indicated by reference numeral 338.

By causing DMD 50 to selectively position each micromirror to one of four states, DMD controller 354 causes DMD 350 to produce an image pattern including pixels corresponding to the passed and/or reflected components from color wheel 330 and/or the LED component, and/or to no component of light. Micromirrors positioned in a first state direct light reflected by color wheel 330 to projection lens 360 and direct light passed by color wheel 330 and light from LED 310 to light dump 370. Micromirrors positioned in a second state direct light passed by color wheel 330 to projection lens 360 and direct light reflected by color wheel 330 and light from LED 310 to light dump 370. Micromirrors positioned in a third state direct light passed by color wheel 330, light reflected by color wheel 330, and light from LED 310 to light dumps 370. Micromirrors positioned in a fourth state direct light from LED 310 to projection lens 360 and direct light passed and reflected by color wheel 330 to light dump 370. The image pattern generated by micromirrors passes to projection lens 360, which then projects the pattern for display. As discussed above, by having LED 310 take the role of one of the color segments in color wheel 330, color wheel 330 may include one less color segment, enlarging the segments for the other colors and resulting in enhanced brightness and image quality.

Modifications, additions, or omissions may be made to the projection system 300 described without departing from the scope of the disclosure. The components of the projection system 300 described may be integrated or separated according to particular needs. Moreover, the operations of the projection system 300 described may be performed by more, fewer, or other components without departing from the scope of the present disclosure.

Although the present disclosure has been described with several embodiments, various changes and modifications may be suggested to one skilled in the art. It is intended that the present disclosure encompass such changes and modifications as fall within the scope of the appended claims.

What is claimed is:

1. A projection system, comprising:
    a light source;
    a color wheel comprising at least three segments and operable to receive light from the light source and filter the light into a passed component and a reflected component;
    a digital micromirror device comprising a plurality of micromirrors each operable to receive the passed component and the reflected component, wherein each micromirror is selectively positionable to each of at least first, second, and third states, wherein:
    in the first state, the micromirror is positioned to direct the passed component to a projection lens and the reflected component to a light dump;
    in the second state, the micromirror is positioned to direct the reflected component to the projection lens and the passed component to a light dump; and
    in the third state, the micromirror is positioned to direct the passed component and the reflected component to a light dump; and
    an optical system operable to direct the passed component and the reflected component from the color wheel to the digital micromirror device.

2. The projection system of claim 1, wherein the light source comprises a lamp operable to emit white light.

3. The projection system of claim 1, wherein the color wheel comprises a green segment, a red segment, and a blue segment.

4. The projection system of claim 1, further comprising a controller operable to increase the brightness of a projected image by causing the digital micromirror device to selectively direct the reflected component to the projection lens.

5. The projection system of claim 1, further comprising a controller operable to enhance the color performance of a projected image by causing the digital micromirror device to selectively direct the reflected component to the project lens.

6. The projection system of claim 1, further comprising a controller operable to reduce the color breakup of a projected image by causing the digital micromirror device to selectively direct the reflected component to the project lens.

7. The projection system of claim 1, further comprising a second light source, wherein:
    each micromirror is further operable to receive light from the second light source;
    each micromirror is selectively positionable to a fourth state;
    in the first state, second state, and third state, the micromirror is further positioned to direct light from the second light source to a light dump; and
    in the fourth state, the micromirror is positioned to direct the light from the second source to the projection lens and the reflected and passed components to a light dump.

8. The projection system of claim 7, wherein the second light source comprises at least one of a light-emitting diode and a laser.

9. The projection system of claim 1, wherein each micromirror is selectively positionable to a fourth state, and in the fourth state, the micromirror is positioned to direct the reflected component and the passed component to the projection lens.

10. A projection system, comprising:
    a color wheel operable to filter light into a passed component and a reflected component;
    a digital micromirror device comprising a plurality of micromirrors each operable to receive the passed component and the reflected component, wherein each micromirror is selectively positionable to direct, at approximately the same time, the passed component and the reflected component to desired locations; and
    an optical system operable to direct the passed component and the reflected component from the color wheel to the digital micromirror device at approximately the same time.

11. The projection system of claim 10, further comprising a light source operable to emit the light filtered by the color wheel.

12. The projection system of claim 10, wherein the color wheel comprises at least three segments.

13. The projection system of claim 10, wherein each micromirror is selectively positionable to each of at least first, second, and third states, wherein:
    in the first state, the micromirror is positioned to direct the passed component to a projection lens and the reflected component to a light dump;
    in the second state, the micromirror is positioned to direct the reflected component to the projection lens and the passed component to a light dump; and
    in the third state, the micromirror is positioned to direct the passed component and the reflected component to a light dump.

14. The projection system of claim 10, further comprising a controller operable to increase the brightness of a projected image by causing the digital micromirror device to selectively direct the reflected component to the projection lens.

15. The projection system of claim 10, further comprising a controller operable to enhance the color performance of a projected image by causing the digital micromirror device to selectively direct the reflected component to the projection lens.

16. The projection system of claim 10, further comprising a controller operable to reduce the color breakup of a projected image by causing the digital micromirror device to selectively direct the reflected component to the project lens.

17. A method for projecting light, comprising:
    filtering received light into a passed component and a reflected component;
    forwarding the passed component and the reflected component; and
    receiving the forwarded passed component and the forwarded reflected component and selectively reflecting either the passed component, the reflected component, or neither component for projection, wherein the forwarding the passed component and the forwarding the reflected component comprises forwarding the components along paths having no colinear portions prior to the selectively reflecting.

18. The method of claim 17, further comprising emitting the light to be filtered.

19. The method of claim 17, wherein the component that is not selectively reflected for projection is forwarded to a light dump.

20. The method of claim 17, wherein selectively reflecting the passed component, the reflected component, or neither component for projection comprises at least in part, determining, by a controller, to use the reflected component to enhance at least one of the brightness of a projected image and the color performance of a projected image.

21. The method of claim 17, wherein selectively reflecting the passed component, the reflected component, or neither component for projection comprises at least in part, determining, by a controller, to use the reflected component to reduce the color breakup of a projected image.

* * * * *